United States Patent [19]

Webster et al.

[11] 3,965,555

[45] June 29, 1976

[54] METHOD OF FORMING JOINTS FOR PROTECTIVELY LINED OR COATED METAL

[75] Inventors: John David Webster; Henry Torrens A. Bowman, both of St. Austell, England

[73] Assignee: English Clays Lovering Pochin & Company Limited, England

[22] Filed: June 10, 1974

[21] Appl. No.: 478,113

[30] Foreign Application Priority Data
Mar. 22, 1974  United Kingdom............... 12988/74
June 6, 1973   United Kingdom............... 28679/73

[52] U.S. Cl. ............................. 29/157 R; 29/458; 285/55; 138/109
[51] Int. Cl.² ................. B21D 53/00; B21K 29/00; B23P 15/26
[58] Field of Search .................. 29/458, 460, 157 R; 219/91, 137; 285/55 X; 138/109 X

[56] References Cited
UNITED STATES PATENTS

| | | | |
|---|---|---|---|
| 2,188,925 | 2/1940 | Ronay | 219/137 R X |
| 2,273,154 | 2/1942 | Stromsoe | 285/55 |
| 2,895,747 | 7/1959 | Bland | 285/55 X |
| 3,132,236 | 5/1964 | Deininger | 219/91 |
| 3,325,191 | 6/1967 | Yates | 29/458 X |

FOREIGN PATENTS OR APPLICATIONS

| | | | |
|---|---|---|---|
| 1,210,063 | 9/1959 | France | 285/55 |
| 1,269,294 | 7/1961 | France | 285/55 |
| 1,431,797 | 2/1966 | France | 285/55 |

Primary Examiner—Charlie T. Moon
Attorney, Agent, or Firm—Larson, Taylor and Hinds

[57] ABSTRACT

There is described a method of joining a first metallic structural member, which comprises a metallic member having a coating of a heat-degradable material on one surface thereof, to a second metallic structural member which comprises a metallic member, along abutting edges by forming a welded joint between the abutting metal edges of the metallic members in which method the metallic member and the coating of the first structural member are separated along that edge of the first structural member which is to be welded to the second structural member by a heat shield which substantially prevents heat being transferred from the welded joint, during the formation thereof, to the coating.

3 Claims, 8 Drawing Figures

METHOD OF FORMING JOINTS FOR PROTECTIVELY LINED OR COATED METAL

BACKGROUND OF THE INVENTION

This invention relates to joints between two metallic structural members and, more particularly but not exclusively, is concerned with a method of forming a joint between a first metallic structural member, which comprises a metallic member having a coating of heat-degradable material adhering thereto, and a second metallic structural member, which may be similar to the first structural member or may simply comprise a metallic member without a coating of heat-degradable material, and which can be welded to the metallic member of the first metallic structural member. The invention is concerned inter alia with a method of joining together two metallic pipe sections, at least one and generally both of the pipe sections including a lining of a heat-degradable material such as a glass, a plastics material, or a natural or synthetic rubber, for example nylon, polyethylene, polypropylene and polyurethane.

Hitherto, attempts to join together abutting ends of two metallic pipe sections, one or both of which sections are lined with a heat-degradable material, e.g. a plastics material, by welding together the abutting ends of the metallic pipe sections have frequently resulted in destruction of the heat-degradable material by the high welding temperatures normally involved or at least a discontinuity or imperfection in the heat-degradable material at the joint.

SUMMARY OF THE INVENTION

In accordance with one aspect of the invention there is provided, in a method of joining together first and second metallic structural members, each of which comprises a metallic member and at least the first of which has a coating on a surface thereof of a heat-degradable material, by forming a welded joint between abutting metal edges of the metallic members, the improvement which comprises the steps of (i) constructing the metallic members of each of the first and second metallic structural members so that it diverges away from said one surface; (ii) applying the heat-degradable material to the metallic member of the first metallic structural member to coat the metallic member in such a way as to leave a space between the heat-degradable material and the adjacent wall of the divergent portion of the metallic member; (iii) locating a heat shield in the space between the heat-degradable material and the adjacent wall of the divergent portion of the metallic member of the first metallic structural member; (iv) aligning the metal edges of the first and second metallic structural members to be joined and urging said metal edges together; and (v) thereafter welding the metal edges of the structural member together.

In accordance with a second aspect of the invention there is provided in a method of joining together first and second metallic structural members, each of which comprises a metallic member and at least the first of which has a coating on a surface thereof of a heat-degradable material, by forming a welded joint between abutting metal edges of the metallic members, the improvement which comprises the steps of (i) constructing the metallic member of each of the metallic structural members so that it diverges away from said one surface along the edge to be welded; (ii) securing a heat shield to said divergent portion of the metallic member of said first metallic structural member on that surface thereof which is to be coated with the heat-degradable material; (iii) applying the heat-degradable material to the metallic member and to said heat shield to coat the same; (iv) aligning the metal edges of the first and second structural members to be joined and urging them together; and (v) thereafter welding the metal edges of the two structural members together.

The invention also provides a pipe or pipe section which comprises a metallic pipe or pipe section having at least one end thereof flared and having a heat-shield disposed within said flared end, and a coating of a heat-degradable material on the inside of said pipe or pipe section and said heat shield.

DESCRIPTION OF THE PREFERRED EMBODIMENTS

In one embodiment of the first aspect of the invention the metallic members of the first and second structural members are preferably bent at ambient temperature and the metal edges to be joined are preferably ground so that when two such edges are brought together there is a V-shaped notch portion on the outer side, to which the welding apparatus can be applied, and an abutting portion on the inner side. The angle of the V-shaped notch portion is advantageously approximately 70° which has been found to be the optimum angle for the welding process. The coating of heat-degradable material preferably extends in a longitudinal direction beyond the end of the bent, or flared, metal portion so that when two similar composite structural members, i.e. each having a heat-degradable lining or coating, are urged together the heat-degradable material is under compression and forms a gas- and liquid-tight seal. Preferably, the thickness of heat degradable material is greater at the bent, or flared, portion of the structural member, i.e. near the intended weld line, than at the remaining unbent portion.

The heat-degradable material may be such as to provide a layer to protect the metal against corrosion and/or abrasion and may be, for example, a plastics material, a natural or synthetic rubber or a glass. Examples of plastics materials and synthetic rubbers which can be used include such materials as polyamides, e.g. nylons, polyolefins, e.g. polyethylenes or polypropylenes, and polyurethanes.

The heat shield which is employed may be made from a thermally non-conducting material, such as a ceramic, or it may be made from a thermally-conducting material, such as a metal, and may be made in one or more pieces. If the heat shield is made in one piece it is preferably shaped so that its inner surface conforms to the outer surface of the heat degradable material and can be located adjacent thereto. Preferably, each end of the heat shield contacts the bent or flared metal portion of eac of the two structural members to be joined when the structural members are urged together. Alternatively, and conveniently, the heat shield may be made in two pieces, each piece being rigidly fixed to the inner wall of the bent, or flared, metal portion of one of the two structural members. With this arrangement, it is preferred for the two pieces of the heat shield just to come into contact with each other when the two structural members are fully urged together. The edge of each piece of the heat shield which is to be fixed to the inner wall of the bent or flared metal portion of the pipe or pipe section is preferably shaped to conform to the contours of the inner wall of the bent metal portion. The heat shield acts as a physical shield to prevent sparks from the welding apparatus from contacting the heat-degradable material and when the heat shield is thermally conducting it also acts as a heat sink to conduct away heat and thus prevent the formation of small high temperature areas during the welding operation. The heat shield may also help to strengthen the structure at the bent or flared portions of the pipe or pipe section to compensate for the loss of strength caused by the bending and to constrain the outer surface of the heat-degradable material so that it is not distorted when two structural members are urged together.

When welding the metallic structural members together care should be taken to ensure that the weld is as complete as possible with the minimum of voidage.

The metallic structural members may be, for example, metal pipe sections at least one of the metal pipe sections including a protective lining of heat-degradable material. In the case of metal pipe sections each end of each section preferably has a flared-out, or bell-shaped, portion which may conveniently be formed at ambient temperature by conventional shaping techniques. The edges of the pipe sections may be aligned and urged together by placing a collet round the flared out end portion of each pipe and drawing the two collets together by suitable means, e.g. long threaded bolts.

Where two lined pipes are to be joined end to end by the method of the invention it is desirable to employ a clamping mechanism or jig to bring the two pipes in correct co-operative alignment as between the abutting faces of the metal layers, the abutting faces of the heat shield when the latter is in two pieces, and the abutting faces of the coatings themselves, and moreover to ensure that during the welding operation an axial compression is exerted on the plane of contact between the above three pairs of co-operating faces. The compression ensures a more effective welding of the metallic members, a more effective contacting (and interlocking) of the faces of the additional coating material, and a good sealing contact between the end faces of the coating itself. It is desirable that the compression between the contacting end faces of the coating is created by the clamping mechanism applying a uniform circumferential pressure to the coating thereby producing a contact joint between the end faces of the coating which is similar in sealing effectiveness to that produced by a normal bolted flange or clamping ring system for securing together pipe sections.

It may be an advantage to introduce between the heat shield and the adjacent wall of the divergent portion of the metallic member of the first metallic structural member a thermally insulating material. The thermally insulating material can be, for example, fibreglass, asbestos, ceramics, glass ceramics or a refractory material, or a mixture of any two or more of such materials. Alternatively, the space between the heat shield and the bent portion of the pipe section may be filled with a gas, which is most conveniently air although other gases such as argon, nitrogen or carbon dioxide may be used.

The methods of the invention enable there to be produced a contact joint between the edges of the protective lining of two similar sections of lined metal pipe sections such that the protective lining of the resulting length of joined pipe retains the same bore over the joint area of the lining surface as that of the bore of the individual lined pipe sections. The method of invention can be applied, for example, to the joining together of metallic structural members having a metallic member of weldable metal, e.g. steels, aluminum and aluminum alloys etc., whatever the method of welding normally employed, e.g. low, high or normal temperature welding techniques. The method of the invention can also be used for welding any first metallic structural member comprising a metallic member and one or more coatings of heat-degradable material to a second structural member which comprises a metallic member formed from a metal which can be welded to the metal of the first structural member. In other words, the method of the invention is not limited to the welding together of two similar structural members having the same or similar structures but it can be used, for example, for welding a plastics-lined steel pipe to an unlined steel pipe. There can be welded together metallic structural members in the form of pipes having typical wall thicknesses of, for example, ¼ inch thick mild steel, and having linings of, for example, polyurethane which is ¼ inch thick. Thicker metallic structural members although requiring more heat for the welding operation have a greater mass of metal to conduct away the heat from the welding zone and the "welding time/heat generated" factor is to some degree self compensating. There is however for any metal used a minimum thickness, appropriate to the welding temperature used, below which the rate of heat conduction by the metal away from the lining material is too low to avoid destruction of the protective lining unless the methods of the invention are employed.

For a better understanding of the invention reference will now be made, by way of example, to the accompanying drawings in which.

Figure 1:
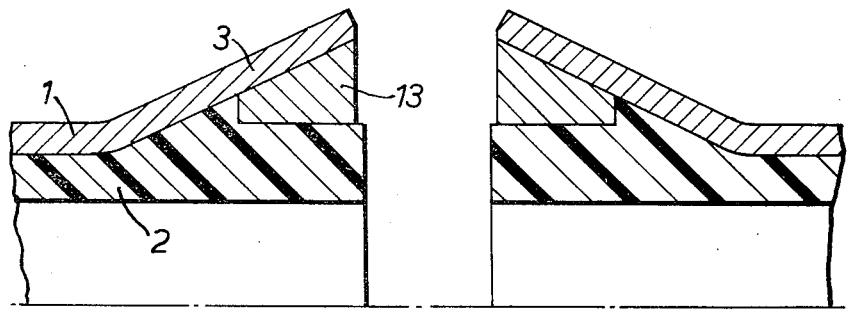
FIGS. 1 and 2 show longitudinal sections of one embodiment of two pipe sections, respectively, before and after being joined together by a method of the invention, each Figure being a longitudinal quarter section through the wall of two polyurethane-lined pipe sections.
Figure 2:
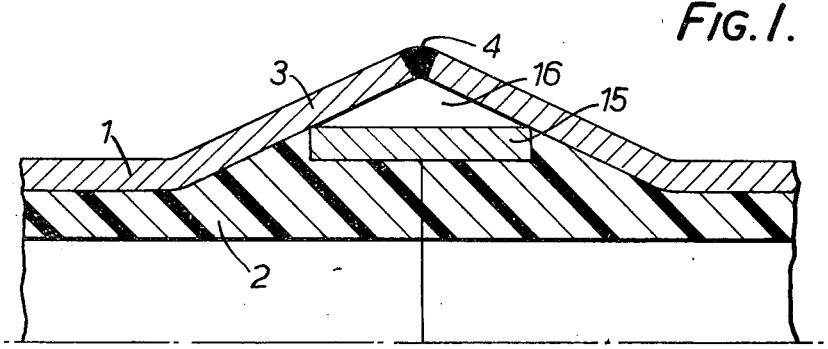

FIGS. 1 and 2 represent, respectively, longitudinal sections through one wall of the ends of two pipes before and after welding. A steel pipe 1 is provided with a flared-out end section 3 made by a conventional flaring technique at ambient temperature. A former 13 is located in the end section 3 and a layer of polyurethane 2 is deposited by a spinning process, such as that described in British Patent application No. 42785/72, to provide a protective lining. The shape of the former 13 is such that the thickness of polyurethane in the flared-out end section 3 is greater than in the cylindrical portion of the pipe 1, and the polyurethane lining extends in a longitudinal direction about 1/16 inch beyond the lip of the end section 3 in order that the polyurethane is under compression and thus forms a tight seal when two sections of pipe are biassed together. When the polyurethane lining has set the former 13 is removed and when it is required to join two pipes together one end of a cylindrical steel collar 15 is slid round the polyurethane lining in the end section of the first pipe and the polyurethane lining in the end section of the second pipe is inserted into the other end of the cylindrical steel collar 15. The two pipes are accurately aligned and urged together by means of a conventional pipe compression coupling device (not shown). The length of the cylindrical steel collar 15 is such that it just touches the wall of the flared-out end section of each pipe when the pipe sections are fully compressed together and its outer diameter is such that an air space 16 exists between the weld and the cylindrical steel collar. The edges of the end sections 3 are ground so that the two pipes are urged together the inner portions of the two edges abut together and the outer portions define a V-notch of angle 70°. The pipes are welded together at 4 in a conventional manner to give a sound weld with the minimum voidage and the pipe compression coupling device is removed. The cylindrical steel collar 15 constitutes a heat shield during the welding process.

Figure 3:
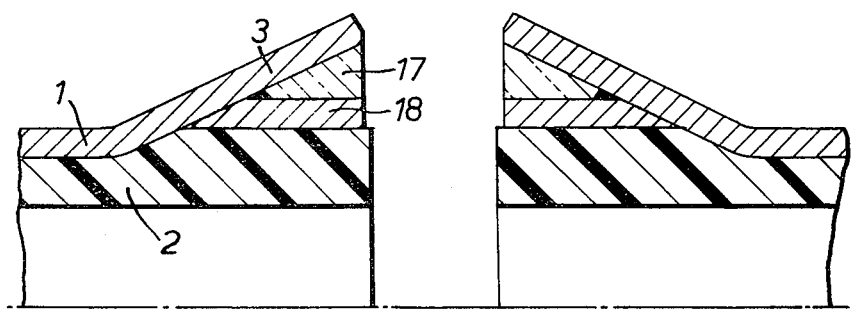
FIGS. 3 and 4 show a similar view of another embodiment of the invention.
Figure 4:
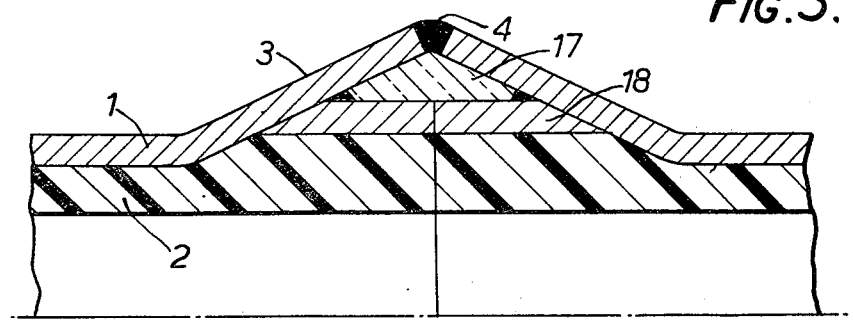

FIGS. 3 and 4 show, respectively, longitudinal sections through one wall of the ends of the two pipes before and after welding. A steel pipe 1 is provided with a flared-out end section 3 as described above and a steel collar 18 is welded inside the end section, the wall at one end of the steel collar 18 being tapered to conform to the inner wall of the end section 3. A layer of polyurethane 2 is deposited by a spinning process to provide a protective lining on the inner wall of the pipe 1 and the steel collar 18. The polyurethane lining projects a longitudinal direction approximately 1/16 inch beyond the free ends of the steel collar 18 and of the end section 3. The space between the outer wall of the steel collar 18 and the inner wall of the end section 3 is packed with a ceramic wool insulating material 17. Two similar pipe sections are aligned and urged together as described above and are welded at 4 with a good quality weld with minimum voidage. When the two pipes are fully compressed together the free ends of the two steel collars 18 and of the end sections 3 just come into contact. The steel collars 18 form a heat shield during the welding process.

Figure 5:
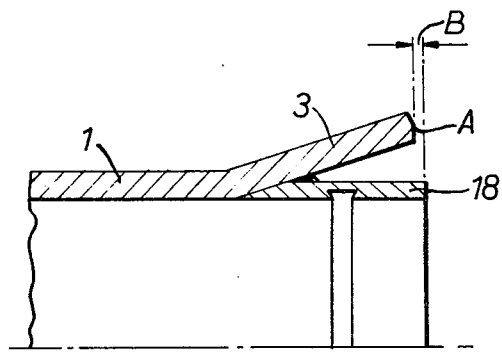
FIGS. 5, 6, 7 and 8 show various stages in the application of a further embodiment of a method of the invention to the welding together of two pipe sections.
Figure 6:
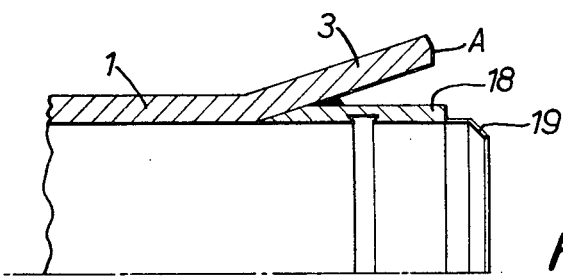
Figure 7:
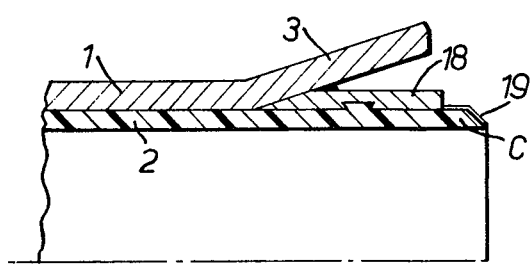
Figure 8:
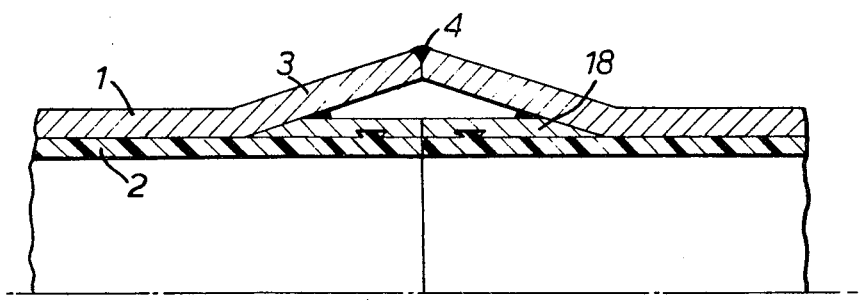

FIGS. 5, 6 and 7 show longitudinal sections through one wall of the end of a pipe section before welding of the pipe section to a similar pipe section, and FIG. 8 shows a longitudinal section of one wall of the ends of the two pipe sections after they have been welded together. A steel section 1 is provided with a flared-out end portion 3 made by a conventional flaring technique at ambient temperature. The end face of the flared-out end portion 3 of pipe section 1 is machined to produce the required welding angle between it and the adjacent end face of the end portion of another pipe section. The end face of the flared-out end portion 3 is machined flat and true. A heat shield ring 18 is welded to the pipe section 1 and the end face of the pipe section is machined to produce a spacing B of predetermined width between the end A of the flared-out end portion 3 and the end of the heat shield ring 18. This width is dependent on techniques to be used and also upon the materials used. The end face of the flared-out end portion 3 is bevelled at A to produce a surface parallel to the end surface of the heat shield ring 18. Before the pipe section and its attached heat shield ring are spun, prior to lining the pipe with the heat-degradable material, a molding end plate 19 is located near to the end of the heat shield ring 18 as shown in FIG. 6. The angled molding end plate 19 allows an excess of lining material to be built up at the end of the heat shield ring. The lining, after curing, will shrink and the length and angle of the end plate 19 are chosen to produce a vertical lining end face after curing. Thus an amount of lining C which extends beyond the heat shield ring 18 is built up during the spinning operation and ensures that when the two pipe sections are joined together by welding together the pipe walls at A the ends of each pipe lining meet under compression and ensure adequate lining seal. The space between the heat shield ring 18 and the pipe wall may contain air or other suitable gas or a heat-insulating material.

In FIG. 8 is shown two pipe sections which have been welded together at 4 and it can be seen that the lining 2 of each pipe section abuts the lining 2 of the other pipe section to form a tight seal.

We claim:

1. in a method of joining together first and second pipe members, each of which comprises a metallic pipe section having a coating on a surface thereof of a heat-degradable material, by forming a welded joint between abutting metal edges of the metallic pipe sections, the improvement which comprises the steps of (i) constructing the metallic pipe section for each of the first and second pipe members so that at one end portion at least thereof it diverges away from the axis of said metallic pipe section; (ii) securing a heat shield to the inside of each divergent end portion of each of the metallic pipe section; (iii) applying the heat-degradable material to the metallic pipe section and to said heat shield to coat the same; (iv) aligning the metal edges of the divergent end portions of second pipe sections and urging them together; and (v) thereafter welding the metal edges of the two metallic pipe sections together to form the desired joint between the first and second pipe members.

2. A method according to claim 1, wherein said heat-degradable material is a plastics material.

3. A method according to claim 1, wherein there is introduced between the heat shield and the adjacent wall of the divergent end portion of each of the metallic pipe sections a thermally-insulating material.

* * * * *